United States Patent [19]

Hudson et al.

[11] Patent Number: 4,984,732

[45] Date of Patent: Jan. 15, 1991

[54] METHOD OF SUPERPLASTICALLY FORMING AND DIFFUSION BONDING A LAMINATE ASSEMBLY

[75] Inventors: Earl K. Hudson, Bonita; Romulo M. Martinez, Chula Vista; James R. Woodward, La Jolla, all of Calif.

[73] Assignee: Rohr Industries, Inc., Chula Vista, Calif.

[21] Appl. No.: 305,565

[22] Filed: Feb. 3, 1989

[51] Int. Cl.⁵ .............................................. B21D 39/00
[52] U.S. Cl. ................................ 228/173.2; 29/421.1; 29/888; 72/709; 228/193
[58] Field of Search ................ 228/155, 156, 157, 193, 228/173.2; 29/157 R, 421.1, 455.1, 888; 72/709

[56] References Cited

U.S. PATENT DOCUMENTS

| | | | |
|---|---|---|---|
| 4,087,037 | 5/1978 | Schur et al. | 228/157 |
| 4,429,824 | 2/1984 | Woodward | 228/212 |
| 4,833,768 | 5/1989 | Ecklurd et al. | 29/157.3 D |

Primary Examiner—Timothy V. Eley
Assistant Examiner—J. Cuda
Attorney, Agent, or Firm—Patrick J. Schlesinger; Frank D. Gilliam

[57] ABSTRACT

A method is provided for achieving predetermined thickness requirements throughout a superplastically formed structure having extreme contours. A laminate assembly of sheets of a metal capable of exhibiting superplasticity, such as titanium alloy, is formed by a combination of superplastic forming and diffusion bonding. The shapes and positioning of the sheets is selected to provide extra metal where the greatest degree of stretching is necessary, such as around the lobes of an exhaust mixer for a turbofan aircraft engine. The gauge can thus be controlled throughout the structure while avoiding weak points and undue weight.

8 Claims, 2 Drawing Sheets

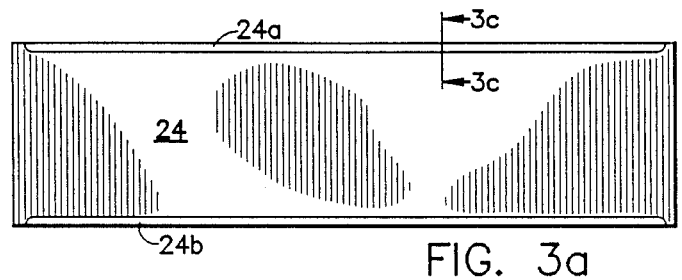
FIG. 3a
FIG. 3b
FIG. 3c
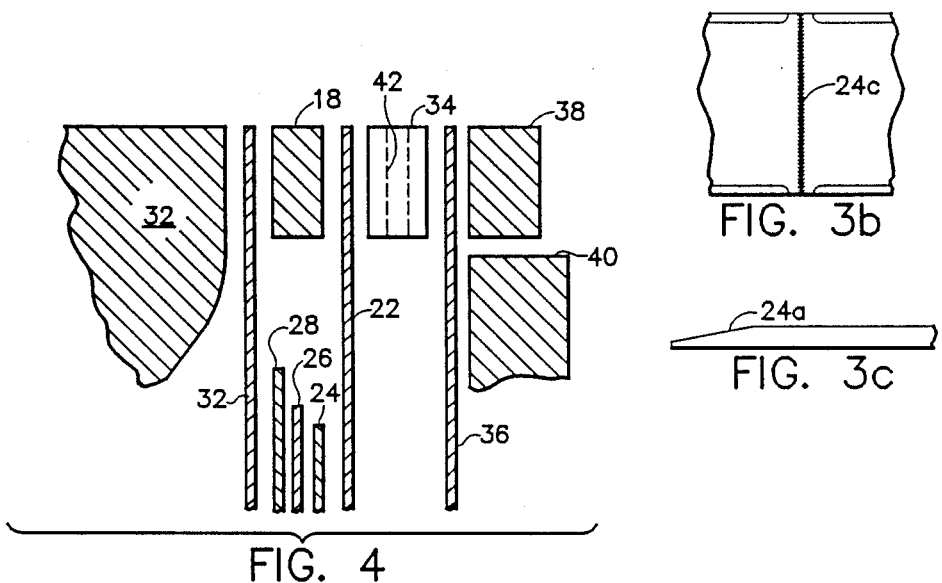
FIG. 4
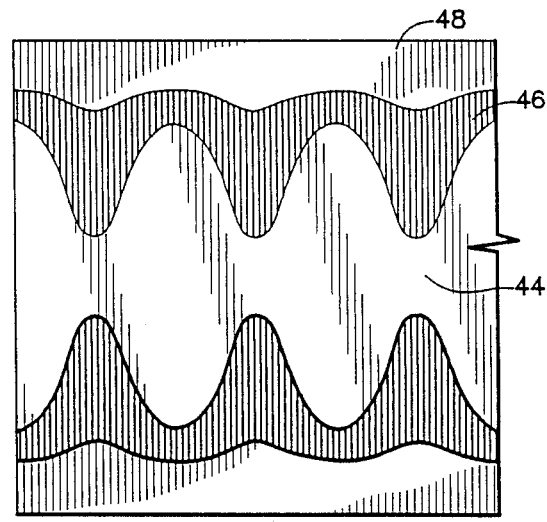
FIG. 5

METHOD OF SUPERPLASTICALLY FORMING AND DIFFUSION BONDING A LAMINATE ASSEMBLY

BACKGROUND OF THE INVENTION

The present invention relates to a method of fabricating structures from several laminations of metal sheets, and more particularly, to a method of fabricating such structures which combines both superplastic forming and diffusion bonding.

For many years it has been known that certain metals, such as titanium, as well as certain metal alloys, exhibit superplasticity within limited temperature ranges and strain rates. Superplasticity is the capability of a material to develop unusually high tensile elongations with a reduced tendency towards necking. Thus when in a superplastic condition, the metal or metal alloy exhibits low resistance to deformation and may be elongated with controlled thinning. This permits a sheet of such metal to be readily formed against dies to achieve desired shapes. Superplastic forming (SPF) may be performed in conjunction with diffusion bonding (DB). Diffusion bonding refers to metallurgical joining of surfaces of similar or dissimilar metals by holding them in physical contact and applying heat and pressure sufficient to cause commingling of the atoms at the junction. Further details of both SPF and diffusion bonding may be had by way of reference to U.S. Pat. No. 3,934,441 of Hamilton et al. entitled "Controlled Environment Superplastic Forming of Metals" and U.S. Pat. No. 3,927,817 of Hamilton et al. entitled "Method of Making Metallic Sandwich Structures".

Thinning or necking of parts frequently occurs during SPF, particularly where the formed sheets must undergo substantial deformations in draping around dies which have sharp radii and/or extend substantial distances generally normal to the sheets. This can lead to undesirable weak points. If the sheets are made thick enough to provide for a minimum thickness at such points, there may be excess metal in other areas, resulting in a structure which is unnecessarily heavy. Such extra weight is particularly undesirable in aircraft. Furthermore, where the parts are formed of expensive metals such as titanium alloys, extra material leads to high additional costs. Accordingly, it is desirable that a structure formed by SPF have a controlled thickness or gauge throughout its various regions and contours.

An example of a structure that is difficult to form by SPF is an exhaust mixer of a turbofan aircraft engine. Typically it comprises a plurality of axially extending, circumferentially spaced lobes which surround the core engine. The lobes mix the fan air and the hot exhaust gases from the turbine to obtain improved noise suppression and/or engine performance. Representative configurations of such exhaust mixers are disclosed in U.S. Pat. No. 4,077,206 of Ayyagari and U.S. Pat. No. 4,149,375 of Wynosky et al.

The size and configuration of exhaust mixers is approaching the limits of superplasticity of titanium sheet materials necessary to permit such structures to be formed. For example, to obtain the minimum thickness requirements via SPF in an exhaust mixer for a very large turbofan engine, it would be necessary to start with a sheet thickness of approximately 0.375 inches. Because of the substantial radial extension of the lobes, a sheet must be stretched about 300% in fabricating one type of exhaust mixer by SPF. Even if SPF could be utilized to form an exhaust mixer from sheet material of the foregoing thickness, an extreme amount of selective chemical milling would be required after the SPF in order to obtain uniform thickness throughout the formed structure.

Accordingly, it would be desirable to provide an improved SPF method that could be used to fabricate large, extremely contoured structures while controlling the thickness or gauge throughout the structures.

SUMMARY OF THE INVENTION

It is therefore the primary object of the present invention to provide a method that combines SPF and DB techniques to form laminate assemblies of titanium alloy or other superplastic metal sheets into large exhaust mixers and other extremely contoured structures while achieving adequate control of the gauge throughout the structures.

Our invention comprises a method of achieving predetermined thickness requirements throughout an SPF structure having extreme contours. This is accomplished by forming a stack of plies of various sizes and shapes of a metal capable of exhibiting superplasticity, prior to forming them by SPF and joining them together by DB. Extra sheet material is located where the greatest degree of stretching is necessary, such as around the lobes of an exhaust mixer. Thus, if desired; the gauge can be made substantially uniform throughout the structure while avoiding weak points and undue weight. For the sake of brevity, our method may be referred to as laminated gauge control (LGC).

BRIEF DESCRIPTION OF THE DRAWINGS

FIG. 3a is a reduced plan view of one of the titanium alloy sheets before it is rolled into a cylinder.

FIG. 3b is a fragmentary view illustrating the weld that holds the ends of the sheet of FIG. 3a together once it has been rolled into a cylinder.

FIG. 3c is an enlarged sectional view of the upper edge of the sheet of FIG. 3a illustrating the feathered edge thereof.

FIG. 4 is a fragmentary diagrammatic illustration of the combined SPF/DB fabrication of a laminate assembly of pre-cut and rolled concentric titanium alloy cylinders into the exhaust mixers of FIG. 1.

FIG. 5 illustrates an alternate layout for the upper and lower edges of the titanium alloy sheets where closer gauge control is desired.

DESCRIPTION OF THE PREFERRED EMBODIMENTS

In the preferred embodiments of our invention the sheets are made of an alloy of titanium, however, other metals and metal alloys may be similarly formed under superplastic conditions and therefore the term "metal capable of exhibiting superplasticity" should be understood to include the same.

Figure 1:
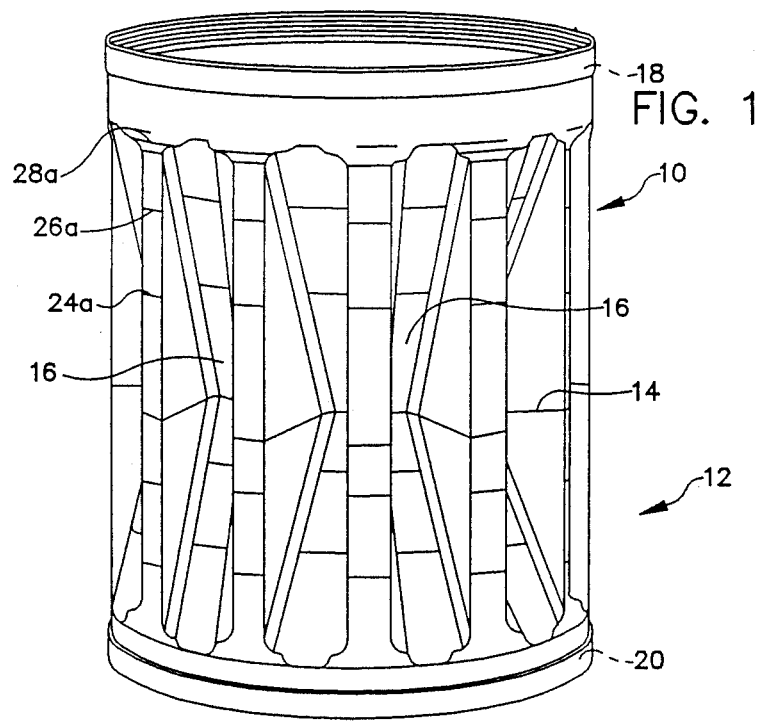
FIG. 1 is a side elevation view of a pair of exhaust mixers that may be fabricated end-to-end utilizing the method of the present invention.

FIG. 1 illustrates a pair of identical exhaust mixers 10 and 12 which may be fabricated according to the method of the present invention. The mixers are fabricated together and later sawed apart along diameter 14. Each mixer has a plurality of axially extending, circumferentially spaced lobes 16 which project a substantial distance radially inwardly toward the axis of the overall cylindrical configuration. The lobes of the mixers 10 and 12 are connected by sealing rings 18 and 20, respectively. Only the impressions formed by these rings are visible in FIG. 1. The mixers are fabricated by a combination of SPF and DB of a plurality of concentric cylinders made of suitable titanium alloy such as Ti6Al-4U or Ti6Al-2Sn-4Zr-2Mo. If the exhaust mixers were to be SPF from a single sheet of titanium alloy, that sheet would have to be stretched or elongated approximately 100% to 300%. Such stretching, even if possible via SPF, would lead to thin areas and weak points, primarily adjacent the lobes. This is because the lobes are the regions where extreme elongations of the sheet would be required.

According to our invention, the exhaust mixers 10 and 12 are simultaneously formed from a stack of plies or sheets of titanium alloy, which have been individually rolled into concentric cylinders. The sheets each have the same initial thickness. However, some of the sheets are sized and positioned so that extra metal will be located in the regions of greatest expected elongation. For a given part configuration the sizes and shapes of the laminations can be determined based upon the calculated amount of thinning for each region of the part to be formed.

Figure 2:
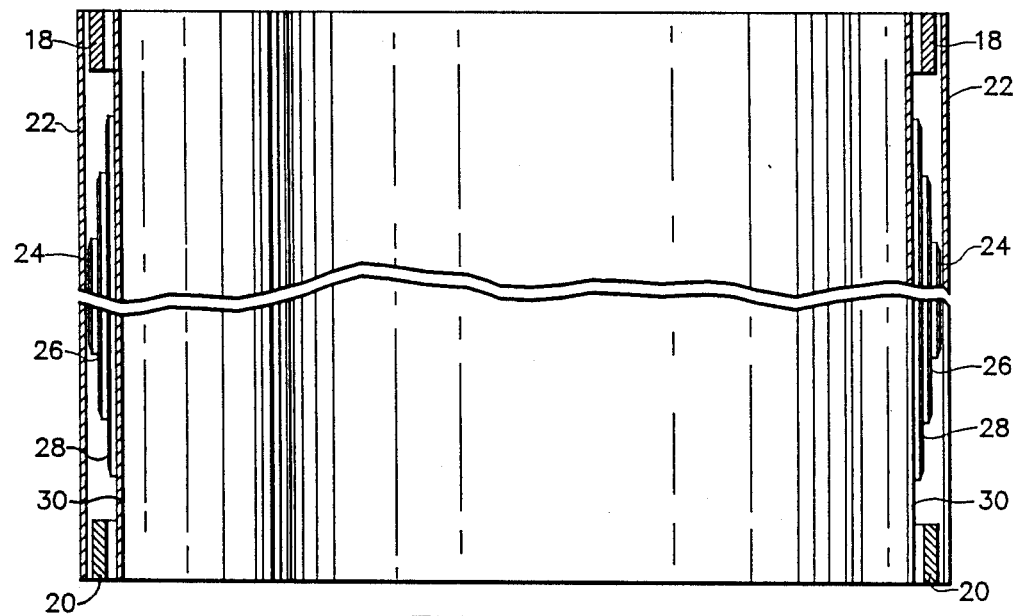
FIG. 2 is a sectional view, broken in the middle, of a concentric assembly of titanium alloy cylinders which may be fabricated into the exhaust mixers of FIG. 1 in accordance with the method of the present invention.

FIG. 2 illustrates a laminate assembly of five titanium alloy sheets in the form of concentric cylinders 22, 24, 26, 28 and 30. The cylinders are formed from sheets have varying widths (vertical dimension in FIG. 2). The lengths of the sheets are selected so that when rolled into cylinders, each will fit snugly in a concentric manner against its adjacent cylinder(s). For example, adjacent cylinders may be rolled to provide 0.020 inches clearance therebetween. The widths and positioning of the sheets are chosen so that the most metal will be concentrated in the region adjacent the diameter 14 (FIG. 1) of the formed mixers 10 and 12. More specifically, as illustrated in FIG. 2, sheets of increasing width are overlapped and vertically centered. In this manner, the extra metal needed to form the extreme contours of the lobes 16 will be provided where most needed. Similarly excess metal will not end up in the ends of the mixers adjacent the sealing rings 18 and 20 where little elongation is required. In this manner, once the pair of mixers is formed, they will have a predetermined gauge throughout. While this gauge will not be completely uniform, it will vary a small amount around a desired nominal value.

As illustrated in FIGS. 3a and 3c, the cut upper and lower edges of the laminations such as 24 are preferably ground to a feather edge at 24a and 24b in the flat prior to rolling. All of the flat sheets are then rolled into cylinders, welded and ground flush. A weld is illustrated in FIG. 3b at 24c. Once formed, the cylinders 22, 24, 26, 28 and 30 are processed cleaned and assembled into concentric abutting relationship.

FIG. 4 diagrammatically illustrates the forming of the laminated cylinders into the mixers 10 and 12. The assembled cylinders are positioned over an inner mandrel 32 made, for example, of 347 corrosion resistant stainless steel. A sealing ring 34 is positioned between the upper edge of the outer cylinder 22 and the upper edge of a seal diaphragm 36, opposite the sealing ring 18. Another sealing ring 38 adjacent a support 40 holds the seal diaphragm tightly against the sealing ring 34. The lower ends of the titanium alloy cylinders, which are not visible in FIG. 4, are similarly positioned and sealed.

The assembled cylinders and tooling are loaded into a vacuum furnace where they are heated to a suitable temperature, e.g. 1600 to 1750 degrees F., at which the titanium alloy becomes superplastic. A gas inlet 42, shown in phantom lines, extends through the sealing ring 34 for enabling the gradual introduction of Argon gas at a suitable pressure, e.g. 300 PSI. The gas is introduced between the outer cylinder 22 and the seal diaphragm 36 in order to force the laminate assembly of cylinders against the inner mandrel 32. The seal diaphragm 36 is backed by support 40 and remains undeformed. Once the cylinders are formed, they are maintained at a suitable temperature and gas pressure for a sufficient duration to achieve DB of the adjacent cylinders. The temperature, pressure and time may vary, but by way of example, the same superplastic temperature of 1600 to 1750 degrees F. may be maintained at 60 to 300 PSI for several hours. In FIG. 1 the lines 24a, 26a and 28a represent the impressions left by the feathered upper edges of the corresponding cylinders in the finished mixers.

U.S. Pat. No. 4,429,824 of Woodward granted Feb. 7, 1984 discloses a method of combining SPF and DB to form a cylindrical shaped part from a pair of titanium sheets which are first rolled into cylinders and concentrically juxtaposed. The tooling utilized includes an internal mandrel made of a material having a relatively high coefficient of thermal expansion and an external mandrel made of a material having a relatively low coefficient of thermal expansion. These mandrels are referred to as Delta-Alpha tooling. Forming shims are positioned within the tooling to predesignate areas of diffusion bonding when the applied pressure and differential expansion of the tooling forces the sheets of material together at the shim locations. Various configurations can be fabricated by combining the LGC method of the present invention with the Delta-Alpha tooling techniques taught in the aforementioned mentioned U.S. Pat. No. 4,429,824.

Where the mixer lobes extend radially outwardly, it may be necessary to first blow portions of the cylinders inwardly during a first SPF stage to permit outer lobe tooling to be positioned. The lobes are then blown outwardly during a second SPF stage.

In some cases, it may be desirable to have even closer gauge control than that achieved in the previous example (FIG. 2). FIG. 5 illustrates the relative sizing and positioning of three sheets which may be formed into a pair of exhaust mixers similar to those illustrated in FIG. 1. A pictorial layout of one of the lobes 16 is first developed. A thickness plot is then compiled that would result if the lobe where formed via SPF from a single sheet of titanium alloy. By using these same thicknesses and converting them into thinning percentages a contour map can be developed. Based on the foregoing analysis the sizes and positioning of the intermediate sheets 44 and 46 relative to the outer sheet 48 can be determined. In the example illustrated in FIG. 5, the outer sheet 48 has straight upper and lower edges. The intermediate sheets 44 and 46 are centered vertically relative to the outer sheet and have upper and lower complementary serpentine edges. The serpentine shape of the upper and lower edges of the innermost sheet 44 is more severe than that of the other intermediate sheet 46. Using a numerically controlled machine, multiple laminations of a given size and shape can be stacked and simultaneously water jet trimmed to contour. The upper and lower edges of the intermediate sheets are again preferably ground to a feathered edge. By careful sizing and positioning with enough laminations, it is possible to achieve a substantially uniform gauge throughout the fabricated part.

While we have described preferred embodiments of our LGC method, it should be understood that modifications and adaptations thereof will occur to persons skilled in the art. For example, our LGC method has been illustrated in conjunction with the SPF/DB fabrication of concentric cylinders. However, our method could also be utilized with flat or planar tooling in the fabrication of parts in a conventional SPF press. Therefore, the protection afforded our invention should only be limited in accordance with the scope of the following claims.

We claim:

1. A method of fabricating a part of a metal capable of exhibiting superplasticity, the part having at least one region of extreme deformation, comprising the steps of:
    providing a plurality of sheets of said metal;
    sizing and positioning at least one of said sheets in overlapping relationship with the remaining sheets to provide additional metal adjacent the region of extreme deformation to be formed, said one sheet having an area smaller than an area of any of the remaining sheets;
    positioning the overlapped sheets adjacent a tool having the shape of the part to be formed;
    heating the sheets so that they exhibit superplasticity;
    forcing the sheets against the tool to form them into the part; and
    subjecting the formed sheets to heat and pressure sufficient to result in diffusion bonding of the overlapped sheets;
    whereby a predetermined nominal gauge is achieved throughout the formed part.

2. A method according to claim 1 wherein the sheets of metal all have the same thickness prior to being formed.

3. A method according to claim 1 wherein the sheets are initially all rectangular in shape and have varying widths.

4. A method according to claim 1 wherein the part has a uniform gauge throughout its structure.

5. A method according to claim 1 wherein the sheets are rolled into cylinders and then placed in concentric juxtaposition prior to being heated and superplastically formed.

6. A method according to claim 5 wherein the cylinders are formed against an internal mandrel.

7. A method according to claim 6 wherein the sheets are heated in a vacuum furnace.

8. A method according to claim 1 wherein there are at least three overlapping sheets, including a rectangular sheet, and a pair of sheets having generally serpentine complementary upper and lower edges.

* * * * *